(12) United States Patent
Magliocco et al.

(10) Patent No.: US 12,441,554 B2
(45) Date of Patent: Oct. 14, 2025

(54) HANGAR GUIDE

(71) Applicant: Walmart Apollo, LLC, Bentonville, AR (US)

(72) Inventors: Jack Magliocco, Delanson, NY (US); Jason Bigler, Hooper, UT (US); Kevin Behr, Cherry Valley, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 777 days.

(21) Appl. No.: 17/745,300

(22) Filed: May 16, 2022

(65) Prior Publication Data

US 2023/0365349 A1  Nov. 16, 2023

(51) Int. Cl.
  *B65G 47/88* (2006.01)
  *B65G 11/20* (2006.01)

(52) U.S. Cl.
  CPC .......... *B65G 47/883* (2013.01); *B65G 11/203* (2013.01); *B65G 11/206* (2013.01); *B65G 2201/0229* (2013.01)

(58) Field of Classification Search
  CPC .. B65G 47/883; B65G 11/203; B65G 11/206; B65G 2201/0229; B65G 11/00; B65G 11/023
  See application file for complete search history.

(56) References Cited

U.S. PATENT DOCUMENTS

| | | | | | |
|---|---|---|---|---|---|
| 1,358,446 | A | * | 11/1920 | Hull | B65G 69/0441 |
| | | | | | 193/31 R |
| 4,434,870 | A | * | 3/1984 | Fisher | A62B 1/20 |
| | | | | | 193/25 B |
| 5,050,743 | A | * | 9/1991 | Lazzarotti | B07C 7/02 |
| | | | | | 211/12 |
| 5,788,054 | A | * | 8/1998 | Janzen | B65G 47/28 |
| | | | | | 198/465.4 |
| 5,975,467 | A | * | 11/1999 | O'Donnell | A62B 1/20 |
| | | | | | 193/25 B |
| 6,634,485 | B1 | * | 10/2003 | Cailbault | B65G 69/16 |
| | | | | | 198/417 |

(Continued)

OTHER PUBLICATIONS

Unknown, Types of Sortation Systems, Applications & Benefits, Conveyco, https://www.conveyco.com/pros-cons-popular-sortation-systems/, captured May 12, 2022, pp. 1-50.

(Continued)

*Primary Examiner* — Mark A Deuble
(74) *Attorney, Agent, or Firm* — Foley IP Law, PLLC (57) ABSTRACT

Examples provide a hanger guide for diverting items having a hanger hook away from dividers on a sloped surface of a sorting machine as the hooked items move through a channel defined by one or more of the dividers. The hanger guide includes a diameter greater than the diameter of a hook on the hooked items preventing the hook from catching on the hanger guide. The hanger guide substantially covers a leading edge of a divider on which the hanger guide is attached preventing a hook from catching on any uncovered portion of the leading edge. The hanger guide is removably attached to the divider via one or more fasteners. When a hook comes into contact with the hanger guide, the hook slides off the hanger guide and proceeds through the channel to the end of the sloped surface unimpeded.

20 Claims, 8 Drawing Sheets

(56) References Cited

U.S. PATENT DOCUMENTS

| | | | |
|---|---|---|---|
| 7,014,030 B2* | 3/2006 | Hendzel | F16M 1/00 |
| | | | 198/368 |
| 7,090,168 B1* | 8/2006 | Brown | B64D 25/14 |
| | | | 193/25 B |
| 7,597,185 B1* | 10/2009 | Fortenbery | B65G 11/203 |
| | | | 406/88 |
| 10,507,980 B1 | 12/2019 | St-Jean et al. | |
| 2006/0037487 A1* | 2/2006 | Suter | A23N 1/003 |
| | | | 99/643 |
| 2021/0187557 A1 | 6/2021 | Vettorazzi | |
| 2022/0063911 A1 | 3/2022 | McLeod et al. | |
| 2022/0120030 A1 | 4/2022 | Schechter et al. | |

OTHER PUBLICATIONS

Unknown, Tilt Tray Sortation Conveyor, Conveyco, https://www.conveyco.com/technology/sortation-systems/case-sorters/tilt-tray-sorter/, captured May 12, 2022, pp. 1-39.

Unknown, "Automated Garment Sorter", Quick and Efficient Garment Sorter, Planiform Conveyors, https://www.planiform.com/product/automatic-garment-sorter/, captured May 12, 2022, pp. 1-5.

\* cited by examiner

HANGAR GUIDE

BACKGROUND

Sorting machines are frequently used in distribution centers, fulfilment centers, warehouses and other item storage locations during sorting, processing and/or packing various types of items for shipment. Sorting machines frequently include dividers which are used to channel items into separate lanes during for placement into totes, boxes, bins, or other areas. As the items slide down the sorter between pairs of dividers, clothing items on hangers can become jammed or otherwise hooked over the ends of the dividers. In such cases, it is typically necessary for a human user to manually clear the jams by pushing or pulling the hooks off the dividers. This can be a difficult, time-consuming, and potentially hazardous task.

SUMMARY

Some examples provide a system for hanger guides on a sorting device. The system includes a plurality of dividers associated with a sloping surface of the sorting device. The plurality of dividers define one or more channels through which items having hanger hooks are able to slide down the sloping surface. A plurality of hanger guides are associated with the plurality of dividers. The plurality of hanger guides include a first hanger guide attached to a first leading edge of an end of a first divider in the plurality of dividers. The first hanger guide includes a diameter of a main body of the first hanger guide that is greater than a diameter of a hook on a hanger associated with an item moving down the sloping surface through the at least one channel.

Other examples provide a hanger guide device having a main body with a vertical length sufficient to substantially cover a surface of a leading edge of a divider on a sloping surface associated with a sorting device. The diameter of the main body is greater than a diameter of a hanger hook. A set of fasteners removably secure the hanger guide over the leading edge of an end of the divider. The hanger guide prevents hanger hooks on items moving down the sloping surface through a channel at least partially defined by the divider from becoming hooked over the leading edge of the end of the divider as the items enter the channel near a top of the sloping surface.

Still other examples provide a hanger guide apparatus. The hanger guide apparatus includes a main body having a flat top member and a rounded base member configured to wrap around a leading edge of an end of a first divider associated with a sorting device. The main body has a vertical length sufficient to substantially cover at least a portion of the leading edge at an end of the first divider associated with a sloping surface of the sorting device. The first divider and a second divider define a channel through which items having at least one hanger associated with the item slide down the sloping surface into a receptacle at a bottom of the sloping surface. A diameter of the main body is greater than a diameter of a garment hanger hook in a folded configuration where the main body is wrapped around the leading edge of the first divider. The main body prevents a hanger hook associated with an item entering the channel from becoming caught on the leading edge of the end of the divider on the sorting device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Sorting machines having dividers separating a shoot or ramp into channels can be used to sort garments and other clothing items into separate boxes, totes, or other containers. However, hangers on clothing items can becomes jammed or caught on the ends of the dividers dozens or even hundreds of times per day. These jams cause sorting delays due to time-required to clear the jams. Moreover, the garments becoming jammed on the dividers may become damaged, lost, or otherwise fail to reach their intended destination due to failure of the garment to exit the sorter in a timely manner.

Referring to the figures, examples of the disclosure enable a hanger guide device. In some examples, the hanger guide device is removably attached to a leading edge of an end of a divider on a sorting machine near a top of a sloping surface. The divider forms a side barrier for a channel. Items on hooks slide down the sloping surface within the channel into a receptacle at the bottom of the sloping surface. The hanger guide device wraps around the leading edge of the end of each divider near the top of the sloping surface forming a cap that is wider than the diameter of the hooks on the items. The hanger guide prevents the hooks from hanging or catching on the leading edge of the ends of the dividers. In this manner, the hanger guide diverts the hangers away from the top end of the divider enabling the items to move freely down through the channel to the receptacle in a timely and efficient manner.

In some examples, the hanger guide has a length that is substantially equal to or greater than a length of the leading edge of the end of the divider. The hanger guide covers all or most of the surface of the leading edge of the divider ends. By covering the leading edge with the hanger guide, there are no exposed portions of the divider end upon which a hook can become caught or lodged. The main body of the hanger guide acts as a diverter preventing hanger hooks from becoming hooked over the leading edge of the end of the divider on the sorting device.

In other examples, the diameter of the main body of the hanger guide is greater than a diameter of a hook on a garment hanger. If a hook touches the hanger guide, it simply slides off the hanger guide because the hook diameter to too small to fit over any portion of the hanger guide. When the hook slides off the hanger guide, the item falls back into the channel directing the item down sorter ramp and into the intended receptacle. The hanger guide prevents the garment hanger hooks on clothing and other items from catching or jamming on the end of the divider as the clothing items slide down a sloping surface of the sorting machine.

In still other examples, a set of fasteners are provided to removably attach the hanger guide devices to the ends of the dividers. The fasteners can include bolts, screws, hook and loop fasteners or any other appropriate type of fastener. A hanger guide is attached to every divider on sorting machines sorting items with hooks or hangers. The hanger guides enable faster and more efficient sorting of items while eliminating jams caused by hangers becoming caught on the divider ends.

In other aspects, the hanger guides include a rounded base at the bottom of the hanger guide. The base can be a rounded or fanned base when extends across the bottom portion of the leading edge of the divider near the top of the sloping surface. As items are dropped out of sorting trays of a conveyor onto the ramp, the hanger guide covers the leading edge from a position at or near a top portion of the leading edge all the way down to the base of the leading edge. In this manner, there are no portion of the leading edge exposed to the hanger hooks. The hanger guide devices reduces maintenance time spent removing items hooked over the divider edges for improved efficiency and reduced maintenance costs. The hanger guides further reduces the number of items which become lost, damaged, or mis-sorted due to jams for improved order fulfillment accuracy.

Figure 1:
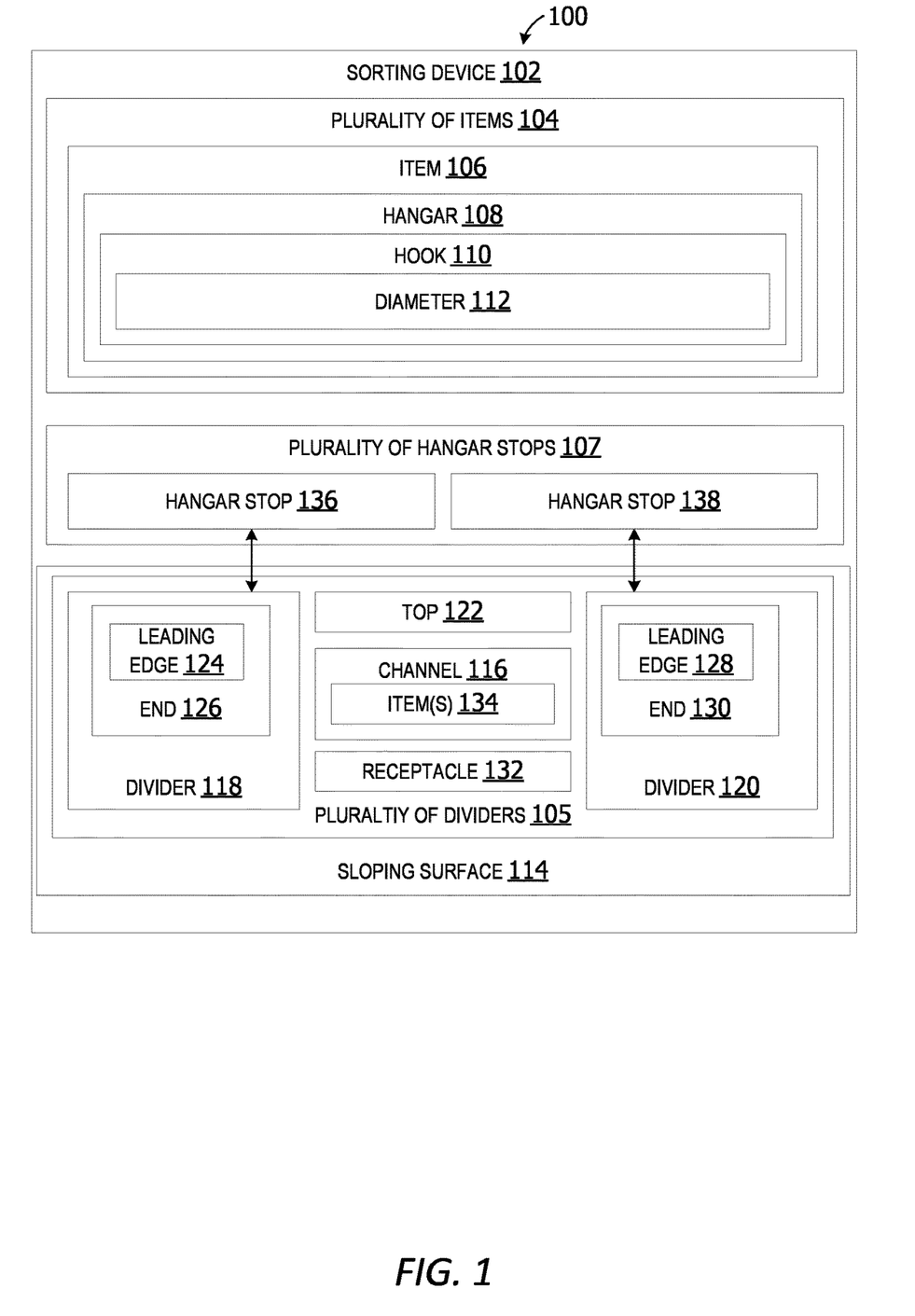
FIG. 1 is an exemplary block diagram illustrating a system including hanger guides for preventing garment hangers from becoming jammed on a sorter.

Referring now to FIG. 1, an exemplary block diagram illustrating a system 100 including hanger guides for preventing garment hangers from becoming jammed on a sorter device 102 is shown. In some examples, the sorting device 102 is a device for sorting a plurality of items 104. In this example, the plurality of items 104 includes one or more items associated with a hanger, such as, but not limited to, the item 106. In this example, the item 106 is a garment or clothing item on a hanger 108 having a hook 110. The hook 110 has a diameter 112 designed to hang on a clothing rack, closet bar, rod, hook, line, rope, or other surface. A garment or clothing item may also be referred to as apparel. A clothing or garment item can include a shirt, pants, robe, skirt, dress, suit, jacket, coat, vest, or any other type of clothing.

However, the item 106 is not limited to clothing or garment items. The item 106 in other examples can include a costume, doll clothing, a toy, a towel, sheet, linen, curtains, toy, backpack, potholders, cooking utensils, bagged books, bagged magazines, bagged graphic novels, art supplies, pet toys, pet supplies, or any other types of item attached to a hanger hook or having a hanger hook associated with the item packaging.

The plurality of items 104 are transported to the sorting device, in some examples, via a set of trays on a conveyor. The conveyor moves the items on the trays to the sorting device. The items slide of the trays onto a top portion of a sloping surface 114 of the sorting device 102. The sloping surface includes a plurality of dividers 105 separating the sloping surface into one or more channels, such as, but not limited to, channel 116. The items move down through the channels into one or more receptacles located at the end of each channel.

A plurality of dividers 105 have a plurality of hanger guides 107. In some examples, the plurality of hanger guides includes one hanger guide for each divider in the plurality of dividers 105. Thus, if the plurality of dividers includes fifty dividers, the plurality of hanger guides includes fifty hanger guides.

In this example, a first divider 118 and a second divider 120 create side boundaries defining the channel 116. The item 106 is dropped onto the top 122 of the sloping surface 114 proximate to the channel 116. As the item slides down the channel 116, the hook 110 on the hanger 108 can become caught or hooked over the leading edge 124 of the top end 126 of the divider 118 or the leading edge 128 of the top end 130 of the divider 120 if a hanger guide is not attached to the ends of the dividers, preventing the item 106 from reaching the receptacle 132 at the bottom of the channel 116.

However, in this example, each of the dividers includes a hanger guide attached to the end of each divider preventing the hooks on one or more item(s) 134 moving down the sloping surface 114 from catching or becoming jammed on the dividers. Here, a first hanger guide 136 is attached to the end 126 of the divider 118, substantially covering the leading edge 124 of the divider 118. A second hanger guide 138 is wrapped around the leading edge 128 of the top end 130 of the second divider 120. The hanger guides have a diameter that is greater than the diameter 112 of the hooks on the item(s) 134 moving down the sloping surface through the channel 116. The hanger guide 136 and the hanger guide 138 diverts the hooks away from the dividers to prevent the items from becoming hooked over the dividers.

Figure 2:
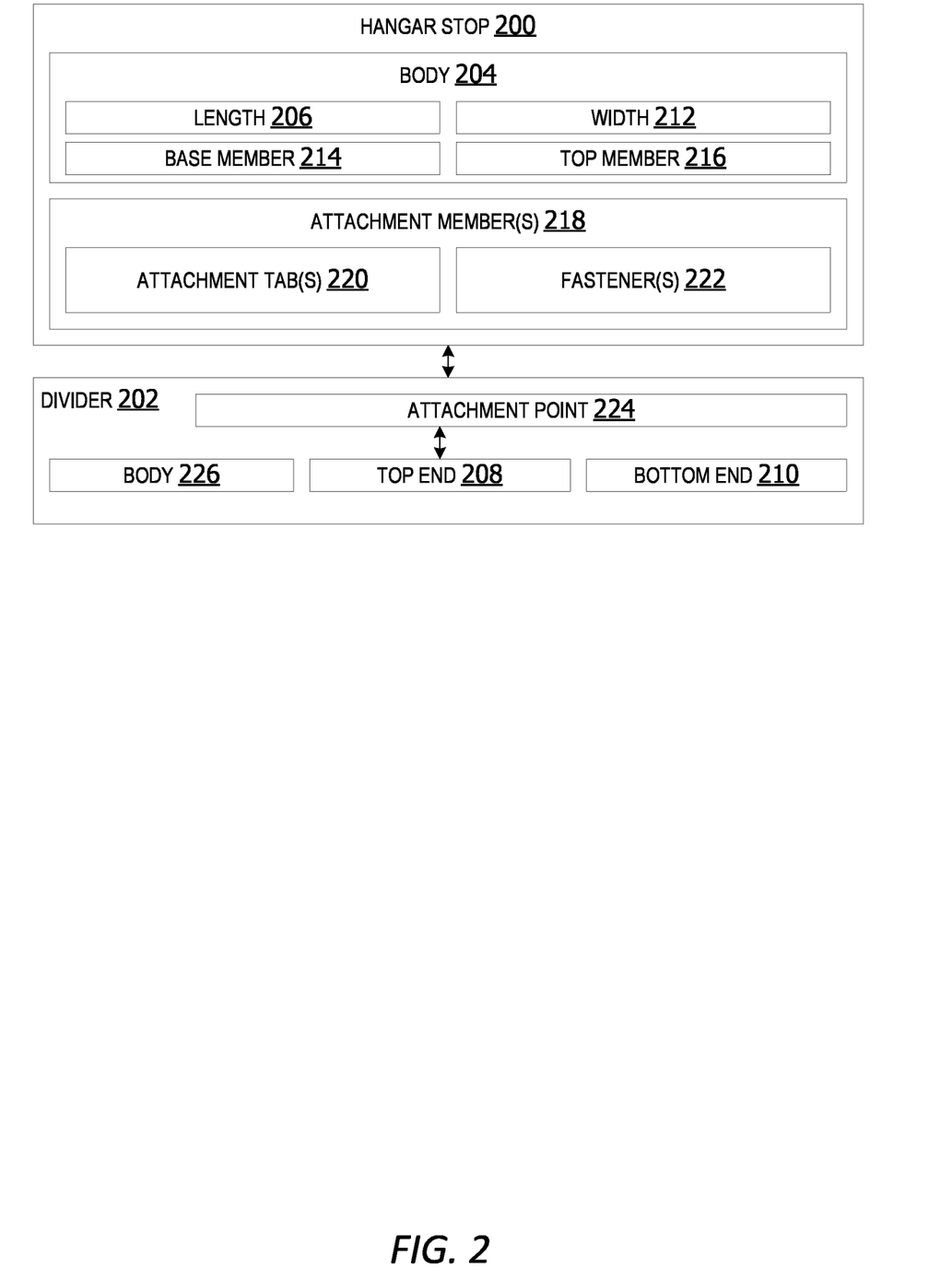
FIG. 2 is an exemplary block diagram illustrating a hanger guide on a divider.

FIG. 2 is an exemplary block diagram illustrating a hanger guide 200 on a divider 202. The hanger guide is a device for preventing hanger hooks from becoming caught on dividers associated with a sorting device, such as, but not limited to, the hanger guide 136 and/or the hanger guide 138 in FIG. 1.

The hanger guide 200 includes a main body 204. The main body 204 has a vertical length 206. In some examples, the vertical length is equal to the vertical length of the leading edge of the top end 208 of the divider 202. The top end 208 of the divider is the end nearest the top of the sloping surface. The bottom end 210 of the divider is the end closest to the bottom of the sloping surface of the sorting device. In other examples, the vertical length of the main body 204 is any length that is sufficient to completely all of the surface of the leading edge of the divider such that the main body substantially covers the leading edge of the divider nearest a top of the sloping surface when the hanger guide is attached to the divider end. In other examples, the hanger guide covers the lower half of the leading edge of the end of the divider from the base of the divider to a point approximately half-way up the divider. In other examples, the hanger guide covers the divider from the base of the divider to a point approximately two-thirds of the way up the end of the divider.

The main body 204 has a width 212 that is greater than a diameter of the hanger hook on the items moving through the sorting device. The width 212 may be referred to as the diameter of the main body 204.

A base member 214 is the bottom portion of the main body of the hanger guide. The base member 214 in some examples has a rounded or fanned shape permitting it to reach the base of the divider leading edge and/or extend slightly beyond the base of the leading edge such that the base of the hanger guide is wider at the base and narrower in the middle and top. The top member 216 is the portion of the main body opposite the base member 214. The top member 216 in this example has a flat or straight top edge.

In some examples, a set of one or more attachment members 218 removably attach the hanger guide 200 to the top end 208 of the divider 202. In this example, the attachment member(s) 218 includes two or more attachment tab(s) 220. Each attachment tab includes one or more fastener(s) 222 securing the hanger guide over the leading edge of an end of the divider. The hanger guide prevents hanger hooks on items moving down the sloping surface through a channel at least partially defined by the divider from becoming hooked over the leading edge of the end of the divider as the items enter the channel near a top of the sloping surface.

The fastener(s) 222 can include any type of fastener. For example, a fastener can include a bolt and nut fastener, a screw fastener, a hook and loop fastener, an adhesive (glue) fastener, or any other type of fastener. Each attachment tab is fastened to a portion of the surface of the divider 202 at an attachment point 224 on the body 226 of the divider 202 via at least one fastener.

In some examples, a first attachment tab extending out of the main body includes an aperture through which a bolt fits. A second attachment tab on the main body opposite the first attachment tab also includes an aperture. The bolt fits through the aperture in the first attachment tab, an aperture at the attachment point 224 on the divider and the aperture in the second attachment tab. In this manner, the bolt secures the pair of attachment tabs to the divider. The hanger guide can include one or more of these attachment pairs secured to the divider via a bolt.

In this example, the hanger guide 200 is removably attached to the divider. In other examples, the hanger guide is permanently attached to the leading edge of the end of the first divider. The hanger guide may be permanently attached via an adhesive or by being permanently welded or molded onto the end of the divider.

The hanger guide 200 in some examples is composed of plastic. In other examples, the hanger guide 200 is made of metal or a composite material. However, the examples are not limited to a hanger guide made from plastic, metal, fiberglass, a composite material, or any other suitable material.

Figure 3:
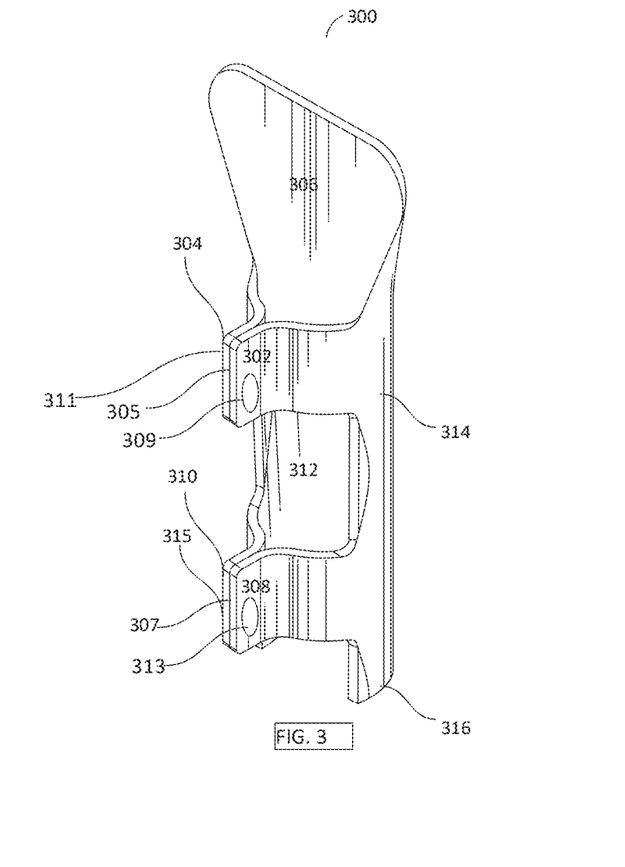
FIG. 3 is an exemplary schematic diagram illustrating a front perspective view of a hanger guide device.

Turning now to FIG. 3, an exemplary schematic diagram illustrating a front perspective view of a hanger guide stop device 300 is shown. The hanger guide device 300 is a device such as, but not limited to, the hanger guide 136 in FIG. 1, the hanger guide 138 in FIG. 1 and/or the hanger guide 200 in FIG. 2.

The hanger guide device 300, in this example, includes a set of attachment tabs fastened together in a folded configuration. The set of attachment tabs, in some examples, includes a first attachment tab 302 fastened to a second attachment tab 304 proximate to a base member of the hanger guide device 300. A third attachment tab 308 is fastened to a fourth attachment tab 310. The fastener 305 used to attach the first attachment tab to the second attachment tab and/or a second fastener 307 to attach the third attachment tab to the fourth attachment tab can include, without limitation, a bolt and nut fastener, a hook and loop fastener, an adhesive, a screw and nut fastener or any other type of fastener suitable to secure the hanger guide over the leading edge of the end of a divider on a sorting device. A first aperture 309 and third aperture 313 are associated with a side of the main body 314 of the hanger guide. A second aperture 311 and fourth aperture 315 are not shown in FIG. 3, but are mirrored or matched to the shown apertures of 309 and 313 in the configuration shown in FIG. 3.

In the folded configuration, the hanger guide main body 314 wraps around forming a cavity 312 sized to fit over the leading edge of the end of the divider. The top member 316 of the hanger guide device 300, in this example, is a flat end. The base member 306, in this example, is a rounded or fan-shaped end. However, the examples are not limited to this configuration. In other examples, the base member 306 is a flat end and the top member 316 is a rounded or fan-shaped end. In still other examples, both the base member and the top member are flat ends. In yet other examples, both the base member and top member are rounded or fan-shaped ends.

Figure 4:
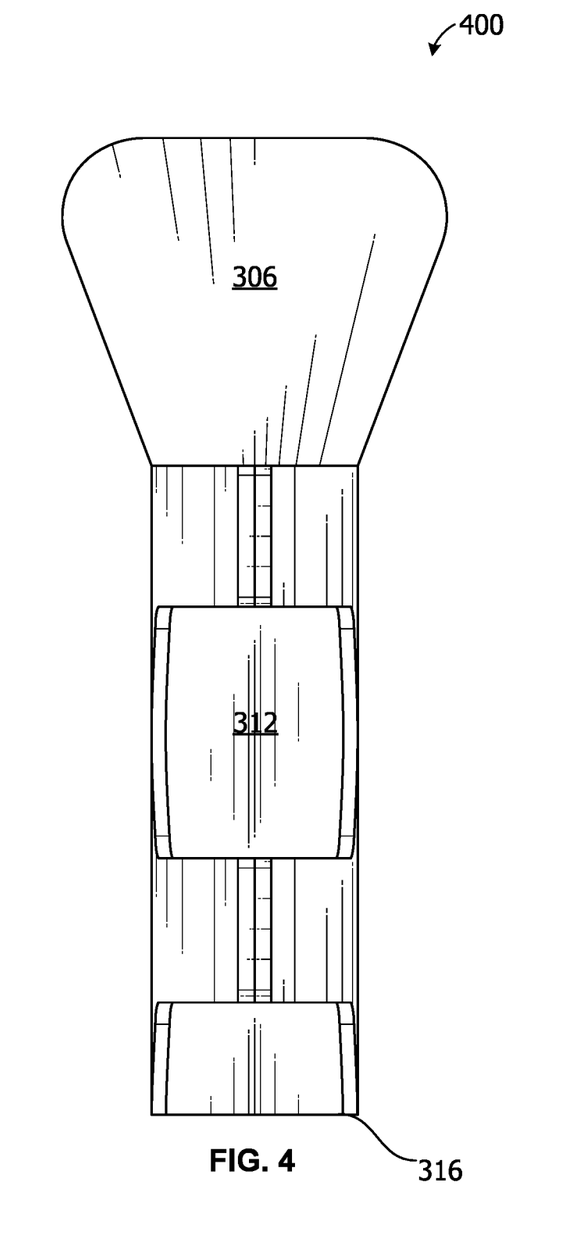
FIG. 4 is an exemplary schematic diagram illustrating a front view of a hanger guide device.

FIG. 4 is an exemplary schematic diagram illustrating a front view of a hanger guide device 400. The hanger guide device 400 is a device such as, but not limited to, the hanger guide 136 in FIG. 1, the hanger guide 138 in FIG. 1, the hanger guide 200 in FIG. 2 and/or the hanger guide device 300 in FIG. 3.

In this example, the hanger guide device 400 is in the folded (fastened) configuration forming an internal cavity 312 sized to fit around a leading edge of the divider. The top member 316 is a fan-shaped end with rounded corners. The base member 316 is a blunt or flat end. The hanger guide device 400 has a length which is substantially similar to the length of the leading edge of the end of the divider near the top of the sloping surface. In some examples, the length of the hanger guide is equal to the length of the end of the divider. In other examples, the length of the hanger guide is less than the length of the end of the divider. The hanger guide device length is no longer than the end of the end of the divider so that hangers will not become caught on any protruding portion of the hanger guide device.

In some examples, when the hanger guide device is attached to the end of the divider, the base member 316 forms a skirt at the base of the end of the divider preventing a hanger from becoming lodged on the base of the divider end.

In this non-limiting example, the length of the hanger guide device 400 is 12.747 inches and the width (diameter) of the hanger guide in the folded configuration is 5.045 inches. However, the examples are not limited to this vertical length and width. The vertical length and width can be any length suitable to substantially cover the leading edge of the top end of the divider and any width/diameter which is greater than the diameter of the hooks on the hangers moving through the sorting device such that it prevents the hanger hooks from catching on the end of the divider.

Figure 5:
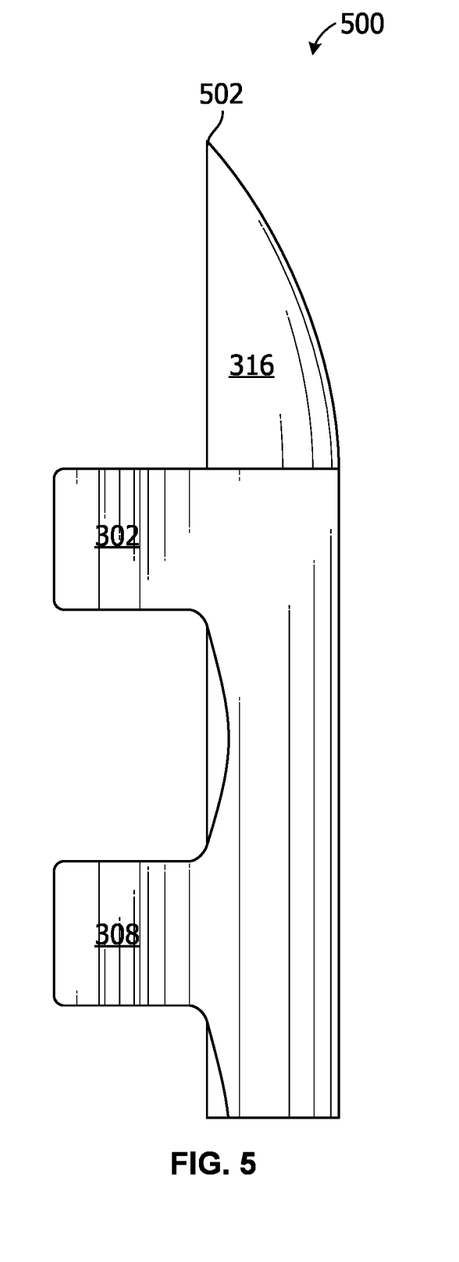
FIG. 5 is an exemplary schematic diagram illustrating a side view of a hanger guide device.

FIG. 5 is an exemplary schematic diagram illustrating a side view of a hanger guide device 500. The hanger guide device 500 is a device such as, but not limited to, the hanger guide 136 in FIG. 1, the hanger guide 138 in FIG. 1, the hanger guide 200 in FIG. 2, the hanger guide device 300 in FIG. 3 and/or the hanger guide device 400 in FIG. 4.

In this example, the base member 316 is a fan-shape which forms a curving or rounded edge ending in a tip 502. When installed, the tip 502 reaches the base of the divider end contacting the sloping surface to form a rounded buffer having a diameter greater than the diameter of the hanger hooks. When a hook contacts any portion of the hanger guide, the hanger hook slides off the hanger guide enabling the item to proceed down the sloping surface to the receptacle at the bottom of the channel formed by a pair of dividers.

The attachment tabs in this example are fastened together. The attachment tabs have a width sufficient to enable the attachment tabs to be fastened to the divider at one or more attachment points. In this example, the attachment tab 302 and attachment tab 308 are approximately 1.875 inches wide. However, the examples are not limited to a width of 1.875 inches. In other examples, the width may be a width greater than 1.875 inches or a width less than 1.875 inches.

In this non-limiting example, the space between the first attachment tab 302 and the second attachment tab 308 is 3.250 inches. However, the examples are not limited to a gap of 3.250 inches. In other examples, the attachment tabs may be more than 3.250 inches apart or less than 3.250 inches apart.

The space between the attachment tab 308 and the top member 316 in this non-limiting example is 1.500 inches. The examples are not limited to a space of 1.500 inches between the top member (top end) of the hanger guide and the attachment tab 308. In other examples, the space can be more than 1.5 inches or less than 1.5 inches.

Figure 6:
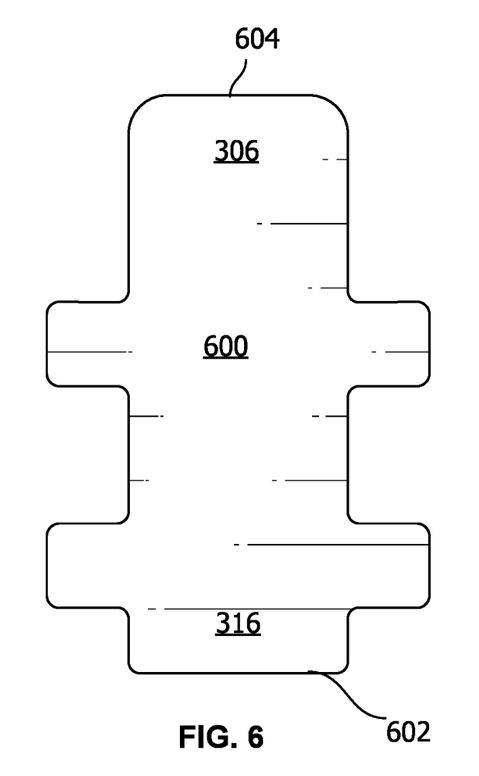
FIG. 6 is an exemplary schematic diagram illustrating a hanger guide device in a flattened configuration.

FIG. 6 is an exemplary schematic diagram illustrating a hanger guide device 600 in a flattened configuration. The hanger guide device 600 is a device such as, but not limited to, the hanger guide 136 in FIG. 1, the hanger guide 138 in FIG. 1, the hanger guide 200 in FIG. 2, the hanger guide device 300 in FIG. 3, the hanger guide device 400 in FIG. 4 and/or the hanger guide device 500 in FIG. 5.

In this example, the hanger guide device 600 has a total vertical length from a top edge 602 of the top member 316 to the bottom edge 604 of the base member 306 of 13.250 inches. However, the examples are not limited to a vertical length of 5.250 inches. In other examples, the vertical length is greater than 13.250 or less than 13.250 inches.

The length of the top edge 602 of the top member in this example is 9.250 inches. The examples are not limited to a length of 9.250 inches. In other examples, the length of the top edge 602 of the top member 316 is greater than 9.250 inches or less than 9.250 inches.

The length of the bottom edge 604 of the base member 316 is a length of 5.250 inches. However, the examples are not limited to a length of 5.25 inches. In other examples, the bottom edge of the base member 306 is greater than 5.25 inches or less than 5.25 inches.

In this example, the top member 316 is a flat end and the base member 306 is rounded. In other examples, the base member is fan-shaped.

Figure 7:
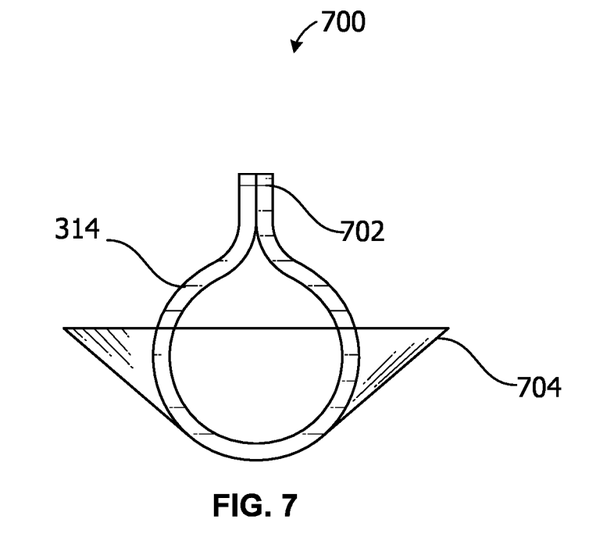
FIG. 7 is an exemplary schematic diagram illustrating a cross section view of the hanger guide device.

FIG. 7 is an exemplary schematic diagram illustrating a cross section view of the hanger guide device 700. The hanger guide device 700 is shown in the folded configuration in which a pair of attachment tabs 702 are fastened together. The base member profile 704 extends beyond the main body 314 due to the rounded, fan-shape of the base member. In this manner, the base member forms a skirt which provides a slightly wider base of the hanger guide, further preventing hanger hooks from becoming lodged on the leading edge of the end of the divider when the hanger guide is attached to the end of the divider.

Figure 8:
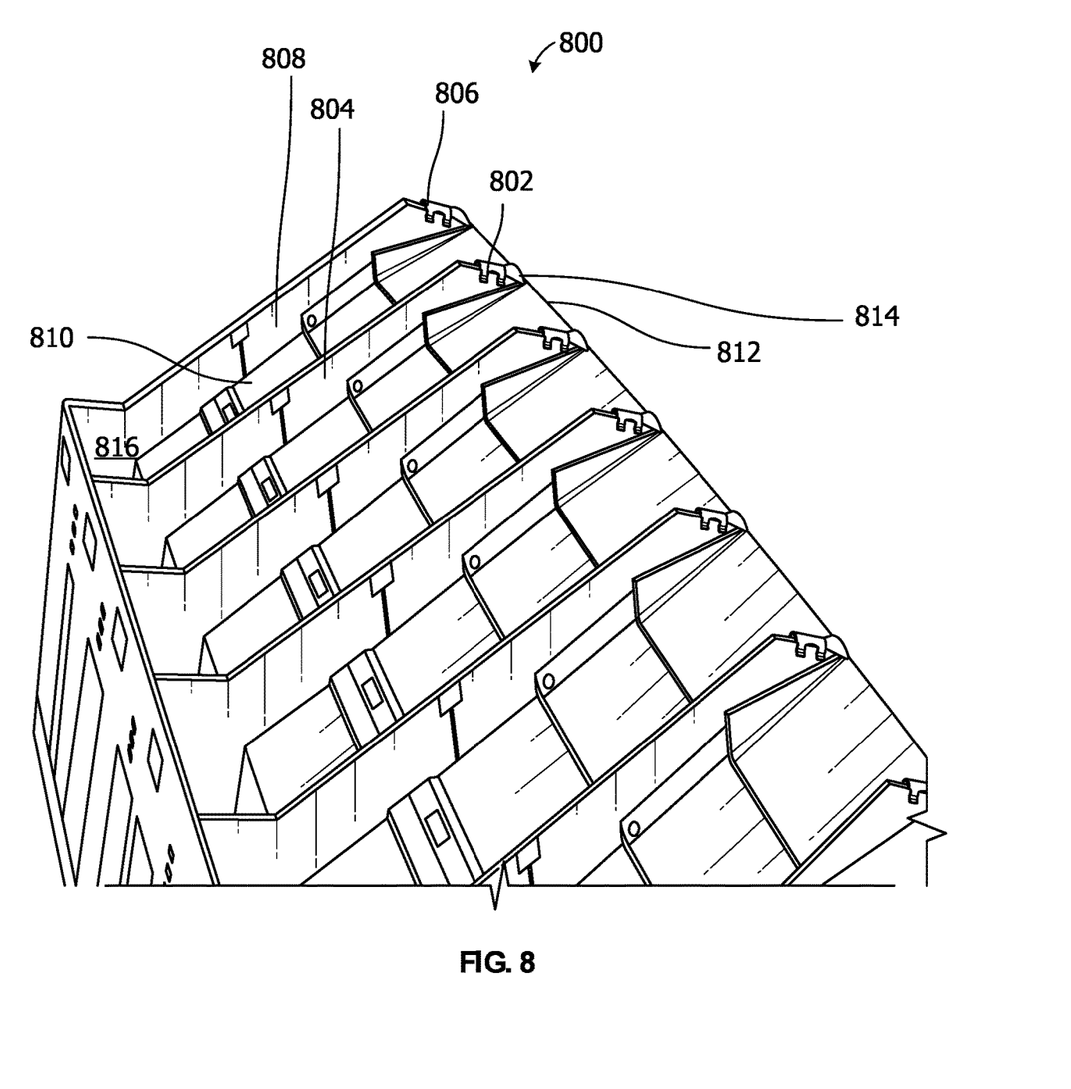
FIG. 8 is an exemplary schematic diagram illustrating a set of divider on a sorting device including a set of hanger guide devices.

FIG. 8 is an exemplary schematic diagram illustrating a set of divider on a sorting device 800 including a set of hanger guide devices. In this example, each divider includes a hanger guide attached to the top end of the divider. For example, a first hanger guide 802 is attached to the leading edge of the end of a first divider 804. Likewise, a second hanger guide 806 is attached to the leading edge of the end of a second divider 808. The divider 804 and 808 form a channel 810. Items released onto the top of the sloping surface 812 slide through the channel 810 between the dividers into a receptacle 816 at the bottom of the sloping surface of the sorting device 800. The hanger guides on each of the dividers prevents hanger hooks on the items from catching on the leading edge of each divider.

In this example, a hanger guide includes a main body and a pair of attachment tabs holding the main body to the divider end. The base member 814 forms a rounded cup or skirt which covers the base of the divider further preventing the hooks from catching on the dividers.

The hanger guides, in this example, cover approximately two-thirds of the end of the dividers. In other examples, the hanger guides cover approximately half of the end of the dividers. In still other examples, the hanger guides cover approximately all of the leading edge of the end of the dividers.

ADDITIONAL EXAMPLES

In some examples, a hanger guide attached to a divider end prevents clothes with hangers sent through a sorter from getting stuck on the edges of the store dividers separating a sloping chute or ramp into lanes or divided channels. The hanger guide covers the leading edge of the dividers and provides too large a diameter for the hangers to hang upon. The device is a hanger guide (diverter) includes a main body having a diameter greater than the width or diameter of clothing hanger hooks, such that a hook on a clothing hanger cannot catch on the main body of the hanger guide and a length substantially similar to a length of an edge of a divider.

In other examples, attachment member(s) for attaching the hanger guide to the edge of the chute divider can fasteners for removably attaching the hanger guide to the top end of a chute divider. The fastener(s) attach each hanger guide device to the top edge of each divider. A sorter can include hundreds of dividers, each divider having its own hanger guide attached to the top edge for preventing clothing on hangers from becoming hooked over the end of the divider as the clothing items slide down the divided channels between one or more of the dividers.

In some examples, the hanger guides cover the leading edge of dividers in a sorting device. Each hanger guide provides too large a diameter for the hangers to hang upon. Without the hanger guides, clothing item hooks can become lodged on the dividers up to four-hundred times a day. With the hanger guides, that number is close to zero.

In an example scenario, the hanger guide device is fabricated using heat malleable plastic cut to shape and then heated and formed around a mandrel. In another example scenario, a hanger guide is installed on every divider. A sorting device can use dozens or even hundreds of hanger guides within a distribution center. For example, if a sorting device has fifty channels defined by one-hundred dividers, the sorting device includes one-hundred hanger guides.

In another example, when clothes or other items with hangers get sent through the sorting device, the hangers do not get stuck on the edges of the store dividers. The hanger guide covers the leading edge of these dividers and provide too large a width or diameter at the end of the divider for the hooks to become caught on the divider ends.

Alternatively, or in addition to the other examples described herein, examples include any combination of the following:
- a plurality of dividers associated with a sloping surface of the sorting device, the plurality of dividers defining at least one channel through which items having hanger hooks are able to slide down the sloping surface, the plurality of dividers comprising a first divider;
- a plurality of hanger guides associated with the plurality of dividers, the plurality of hanger guides comprising a first hanger guides attached to a first leading edge of an end of the first divider;
- a diameter of a main body of the first hanger guide that is greater than a diameter of a hook on a hanger associated with an item moving down the sloping surface through the at least one channel;
- a vertical length of the main body of the first hanger guide substantially equal to a vertical length of the leading edge of the end of the first divider, wherein the first hanger guide substantially covers at least a portion of the leading edge of the end of the first divider;
- a fastener for removably attaching the hanger guide to the first leading edge of the end of the first divider;
- wherein the fastener further comprises at least one of a bolt fastener, a screw fastener, a hook and loop fastener and an adhesive fastener.
- a first attachment tab defining a first aperture associated with a first side of the main body of the hanger guide device;
- a second attachment tab defining a second aperture associated with a second side of the main body of the hanger guide device, wherein a fastener for removably attaching the hanger guide to the first leading edge of the end of the first divider is threaded through the first aperture of the first attachment tab, a mounting aperture within a portion of the divider at the end of the divider, and the second aperture of the second attachment tab to removably secure the main body of the hanger guide device to the end of the divider, wherein the main body of the divider substantially covers the leading edge of the divider;
- a third attachment tab defining a third aperture associated with the first side of the main body of the hanger guide device;
- a fourth attachment tab defining a fourth aperture associated with the second side of the main body of the hanger guide device;
- wherein a second fastener fits through the third aperture of the third attachment tab, a second mounting aperture within a second portion at the end of the divider, and the fourth aperture of the fourth attachment tab to removably secure the main body of the hanger guide device to the end of the divider;
- wherein the first hanger guide is permanently attached to the leading edge of the end of the first divider;
- wherein the plurality of hanger guide further comprises a second hanger guide attached to a second leading edge of an end of a second divider;
- a vertical length of a main body of the second hanger guide substantially similar to a vertical length of the leading edge of the end of the second divider, wherein the first hanger guide substantially covers the leading edge of the end of the second divider;
- a diameter of the main body of the second hanger guide greater than a diameter of a hook on a hanger associated with an item moving down the sloping surface through the at least one channel;
- wherein a first hook on a first hanger associated with a first item is diverted away from the first leading edge of the end of the first divider by the first hanger guide;
- wherein a second hook on a second hanger associated with a second item is diverted away from the second leading edge of the end of the second divider by the second hanger guide;
- wherein an item associated with a hook on a hanger diverted away from the first divider by the first hanger guide is a clothing item;
- a folded configuration in which the first hanger guide is folded around a portion of the leading edge of the first divider, wherein the first hanger guide in the folded configuration comprises an end wrapping around a portion of the leading edge of the first divider and a second end of the hanger guide forming a rounded base;
- a rounded base member of the hanger guide device forming skirt covering a bottom portion of the leading edge of the divider when the hanger guide device is in a folded configuration wrapped around the end of the divider;
- wherein the hanger guide device is composed of molded plastic;
- a main body having a flat top member and a rounded base member configured to wrap around a leading edge of an end of a first divider associated with a sorting device;
- a vertical length of the main body sufficient to substantially cover at least a portion of the leading edge at an end of the first divider associated with a sloping surface of the sorting device, the first divider and a second divider defining a channel through which items having at least one hanger associated with the item slide down the sloping surface into a receptacle at a bottom of the sloping surface;
- a diameter of the main body greater than a diameter of a garment hanger hook in a folded configuration where the main body is wrapped around the leading edge of the first divider, wherein the main body prevents a hanger hook associated with an item entering the channel from becoming caught on the leading edge of the end of the divider on the sorting device.

While the aspects of the disclosure have been described in terms of various examples with their associated operations, a person skilled in the art would appreciate that a combination of operations from any number of different examples is also within scope of the aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for hanger guides on a sorting device, the system comprising:
    a plurality of hangers, wherein each hanger of the plurality of hangers includes a hanger hook;
    a plurality of dividers associated with a sloping surface of the sorting device, the plurality of dividers defining at least one channel through which the hanger hook is able to slide down the sloping surface, the plurality of dividers including a first divider; and
    a plurality of hanger guides associated with the plurality of dividers, the plurality of hanger guides comprising a first hanger guide attached to a first leading edge of an end of the first divider, wherein the first hanger guide comprises a main body configured to enable passage of the hanger hook past the first leading edge of the first divider associated with the sloping surface of the sorting device into a receptacle at a bottom of the sloping surface, wherein the first hanger guide further comprises:
        a diameter of the main body of the first hanger guide that is greater than a diameter of a hook on a hangar associated with an item moving down the sloping surface through the at least one channel.

2. The system of claim 1, wherein the first hanger guide further comprises:
    a vertical length of the main body of the first hanger guide substantially equal to a vertical length of the first leading edge of the end of the first divider, wherein the first hanger guide substantially covers at least a portion of the first leading edge of the end of the first divider.

3. The system of claim 1, wherein a hanger guide further comprises:
    a fastener for removably attaching the hanger guide to the first leading edge of the end of the first divider.

4. The system of claim 3, wherein the fastener further comprises at least one of a bolt fastener, a screw fastener, a hook and loop fastener and an adhesive fastener.

5. The system of claim 1, wherein the first hanger guide further comprises:
    a first attachment tab defining a first aperture associated with a first side of the main body of a hanger guide device; and
    a second attachment tab defining a second aperture associated with a second side of the main body of the hanger guide device, wherein a fastener for removably attaching the first hanger guide to the first leading edge of the end of the first divider is threaded through the first aperture of the first attachment tab, a mounting aperture within a portion of the first divider at the end of the first divider, and the second aperture of the second attachment tab to removably secure the main body of the hanger guide device to the end of the first divider, wherein the main body of the first divider substantially covers the first leading edge of the first divider.

6. The system of claim 5, wherein the first hanger guide further comprises:
    a third attachment tab defining a third aperture associated with the first side of the main body of the hanger guide device; and
    a fourth attachment tab defining a fourth aperture associated with the second side of the main body of the hanger guide device, wherein a second fastener fits through the third aperture of the third attachment tab, a second mounting aperture within a second portion at the end of the first divider, and the fourth aperture of the fourth attachment tab to removably secure the main body of the hanger guide device to the end of the first divider.

7. The system of claim 1, wherein the first hanger guide is attached to the first leading edge of the end of the first divider using adhesive, welding or another non-detachable joining mechanism.

8. The system of claim 1, wherein the plurality of hanger guides further comprises a second hanger guide attached to a second leading edge of an end of a second divider, wherein the second hanger guide further comprises:
- a vertical length of a main body of the second hanger guide substantially similar to a vertical length of the second leading edge of the end of the second divider, wherein the first hanger guide substantially covers the second leading edge of the end of the second divider; and
- a diameter of the main body of the second hanger guide greater than the diameter of the hook on a hanger associated with the item moving down the sloping surface through the at least one channel.

9. The system of claim 8, wherein each of the first hanger guide and second hanger guide comprises a flat top member and a rounded base member extending from a base of a respective leading edge to a point at least halfway up the respective leading edge, the rounded base member being configured to enable passage of a hanger hook past the respective leading edge of a respective divider into a receptacle at a bottom of the sloping surface.

10. The system of claim 1, wherein the item associated with the hanger hook is transferred from a tray of a conveyor system onto the sloping surface and is guided by the first hanger guide through a channel to the receptacle at the bottom of the sloping surface.

11. The system of claim 1, wherein the first hanger guide further comprises:
- a folded configuration in which the first hanger guide is folded around a portion of the first leading edge of the first divider.

12. A hanger guide device for use on a divider of a sorting device, the hanger guide device comprising:
- a main body;
- a vertical length of the main body sufficient to substantially cover a first leading edge of the divider on a sloping surface associated with the sorting device, wherein the main body substantially covers the first leading edge of the divider nearest a top of the sloping surface;
- a diameter of the main body that is greater than a diameter of a garment hanger hook; and
- a set of fasteners removably securing the hanger guide device over the first leading edge of an end of the divider, wherein the main body of the hanger guide device is configured to enable passage of a hanger hook past the first leading edge of the divider associated with the sloping surface of the sorting device and prevent hanger hooks moving down the sloping surface through a channel at least partially defined by the divider from becoming hooked over the first leading edge of the end of the divider as items enter the channel near the top of the sloping surface.

13. The hanger guide device of claim 12, wherein the set of fasteners further comprises:
- a first attachment tab including a first aperture for accommodating a first fastener; and
- a second attachment tab including a second aperture for accommodating the first fastener, wherein the first fastener for removably attaching the hanger guide device to the first leading edge of the end of a first divider is threaded through the first aperture of the first attachment tab, a mounting aperture within a portion of the divider at the end of the divider, and the second aperture of the second attachment tab to removably secure the main body of the hanger guide device to the end of the divider, wherein the main body of the divider substantially covers the first leading edge of the divider.

14. The hanger guide device of claim 13, further comprising:
- a third attachment tab including a third aperture within the third attachment tab of the hanger guide device; and
- a fourth attachment tab including a fourth aperture, wherein a second fastener fits through the third aperture of the third attachment tab, a second mounting aperture within a second portion at the end of the divider, and the fourth aperture of the fourth attachment tab to removably secure the main body of the hanger guide device to the end of the divider.

15. The hanger guide device of claim 12, further comprising:
- a rounded base member of the hanger guide device forming skirt covering a bottom portion of the first leading edge of the divider when the hanger guide device is in a folded configuration wrapped around the end of the divider.

16. The hanger guide device of claim 12, wherein the hanger guide device is composed of molded plastic.

17. The hanger guide device of claim 12, wherein a fastener in the set of fasteners further comprises at least one of a bolt fastener, a screw fastener, a hook and loop fastener and an adhesive fastener.

18. A hanger guide apparatus comprising:
- a main body having a flat top member and a rounded base member configured to wrap around a first leading edge of an end of a first divider associated with a sorting device;
- a vertical length of the main body sufficient to substantially cover at least a portion of the first leading edge at the end of the first divider associated with a sloping surface of the sorting device, the first divider and a second divider defining a channel through which items having at least one hanger associated with the items slide down the sloping surface, wherein the main body is configured to enable passage of a hanger hook past the first leading edge of the first divider associated with the sloping surface of the sorting device into a receptacle at a bottom of the sloping surface; and
- a diameter of the main body greater than a diameter of a garment hanger hook in a folded configuration where the main body is wrapped around the first leading edge of the first divider and prevents the hanger hook associated with an item entering the channel from becoming caught on the first leading edge of the end of the first divider on the sorting device.

19. The hanger guide apparatus of claim 18, further comprising:
- a first attachment tab defining a first aperture associated with a first side of the main body of a hanger guide device;
- a second attachment tab defining a second aperture associated with a second side of the main body of the hanger guide device, wherein a first fastener for removably attaching the hanger guide device to the first leading edge of the end of the first divider is threaded through the first aperture of the first attachment tab, a mounting aperture within a portion of the first divider at the end of the first divider, and the second aperture of the second attachment tab to removably secure the first attachment tab and the second attachment tab to the first divider;

a third attachment tab defining a third aperture associated with the first side of the main body of the hanger guide device; and a fourth attachment tab defining a fourth aperture associated with the second side of the main body of the hanger guide device, wherein a second fastener fits through the third aperture of the third attachment tab, a second mounting aperture within a second portion at the end of the first divider, and the fourth aperture of the fourth attachment tab to removably secure the third attachment tab and the fourth attachment tab to the first divider, wherein the main body wraps around a portion of the end of the first divider.

20. The hanger guide apparatus of claim 18, wherein the hanger guide apparatus is configured to enable the passage of the hanger hook past the first leading edge of the first divider associated with the sloping surface of the sorting device into the receptacle at the bottom of the sloping surface.

\* \* \* \* \*

UNITED STATES PATENT AND TRADEMARK OFFICE
CERTIFICATE OF CORRECTION

| | | |
|---|---|---|
| PATENT NO. | : 12,441,554 B2 | Page 1 of 1 |
| APPLICATION NO. | : 17/745300 | |
| DATED | : October 14, 2025 | |
| INVENTOR(S) | : Jack Magliocco et al. | |

It is certified that error appears in the above-identified patent and that said Letters Patent is hereby corrected as shown below:

On the Title Page

Item (54) and in the Specification Column 1, Line 1, the title please change "HANGAR" to --HANGER--

Signed and Sealed this
Twenty-fifth Day of November, 2025

John A. Squires
*Director of the United States Patent and Trademark Office*